(12) United States Patent
Byfield et al.

(10) Patent No.: US 6,754,992 B1
(45) Date of Patent: Jun. 29, 2004

(54) CONNECTING APPARATUS

(75) Inventors: Michael Patrick Byfield, Faringdon (GB); Bassam Adeeb Burgan, Bracknell (GB)

(73) Assignee: The Steel Construction Institute, Ascot (GB)

( * ) Notice: Subject to any disclaimer, the term of this patent is extended or adjusted under 35 U.S.C. 154(b) by 0 days.

(21) Appl. No.: 09/868,927

(22) PCT Filed: Nov. 14, 2001

(86) PCT No.: PCT/GB00/04338

§ 371 (c)(1),
(2), (4) Date: Oct. 9, 2001

(87) PCT Pub. No.: WO01/36761

PCT Pub. Date: May 25, 2001

(30) Foreign Application Priority Data

Nov. 16, 1999 (GB) .............................. 9927012

(51) Int. Cl.[7] ................................................ E04B 2/74
(52) U.S. Cl. ..................... 52/36.5; 52/36.1; 52/582.1; 52/656.9; 52/714; 52/737.2; 403/205
(58) Field of Search ................................ 52/36.5, 36.1, 52/582.1, 655.1, 650.1, 656.9, 712, 714, 702, 736.2, 737.2, 633; 403/205, 353, 403, 231; 211/192; 248/218.4, 220.1, 220.43, 223.21, 221.12, 222.41, 235; 5/288, 299, 304, 282.1; 312/265.4, 265.1, 263

(56) References Cited

U.S. PATENT DOCUMENTS

| | | | | |
|---|---|---|---|---|
| 633,651 A | * | 9/1899 | Kohn | 5/288 |
| 1,271,116 A | * | 7/1918 | Ballenberg | 5/288 |
| 1,736,878 A | * | 11/1929 | Duvall | 5/288 |
| 3,392,848 A | * | 7/1968 | McConnell et al. | 211/192 |
| 3,977,801 A | * | 8/1976 | Murphy | 403/189 |
| 5,743,672 A | * | 4/1998 | Cline | 403/403 |

FOREIGN PATENT DOCUMENTS

CA  WO 93/19642  * 10/1993

OTHER PUBLICATIONS

Parker, Dave, "Steel connector promises to slash erection time by half", New Civil Engineer.
"Slotting into place", the architects' journal, Jul. 9, 2001, p. 39.
Burgan, Bassam, "A steel slot system that speeds up connection", Construction News Mar. 28, 2002.

* cited by examiner

*Primary Examiner*—Carl D. Friedman
*Assistant Examiner*—Naoko Slack
(74) *Attorney, Agent, or Firm*—Bacon & Thomas, PLLC

(57) ABSTRACT

A connector for providing a load supporting connection between a first "supporting" structural member and a second structural member supported thereby comprises a flange and an integral web formed with one or an array of two or more spaced slots. The flange may also be formed with an array of spaced slots. In a preferred embodiment, the slots of the flange have a lower portion dimensioned to receive a head of a stud which projects from a surface of the supporting member and a coextensive upper portion dimensioned to receive the shank of the stud. The slots of the web have an upper portion dimensioned to receive a head of a stud which projects from a surface of the supported member and a coextensive lower portion dimensioned to receive the shank of the stud. In a preferred embodiment, the width of each shank receiving slot portion is less than the width of the respective stud head.

42 Claims, 13 Drawing Sheets

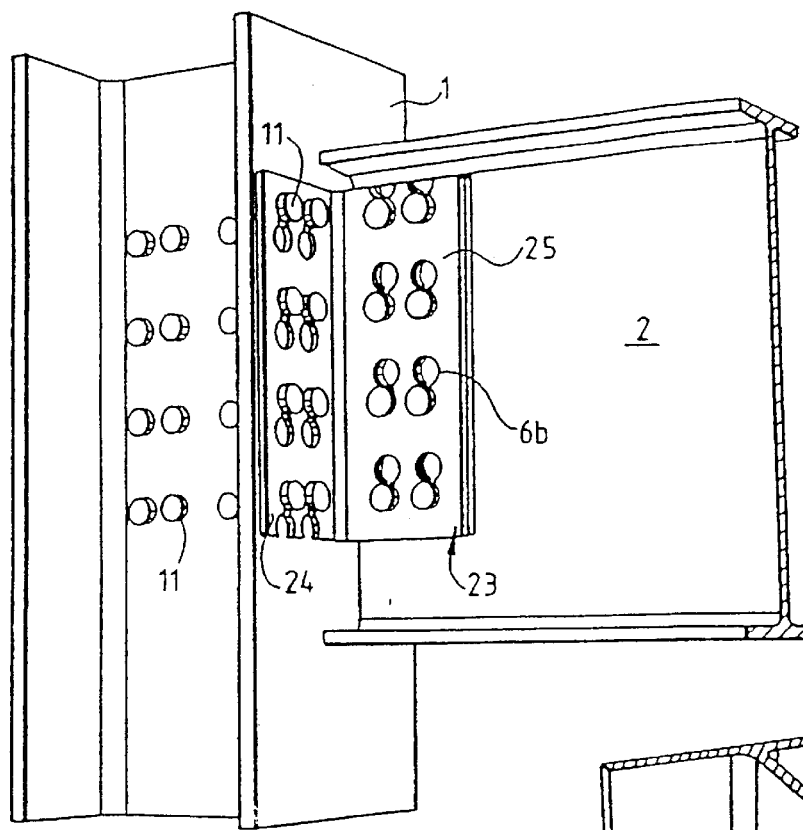
Fig.13.
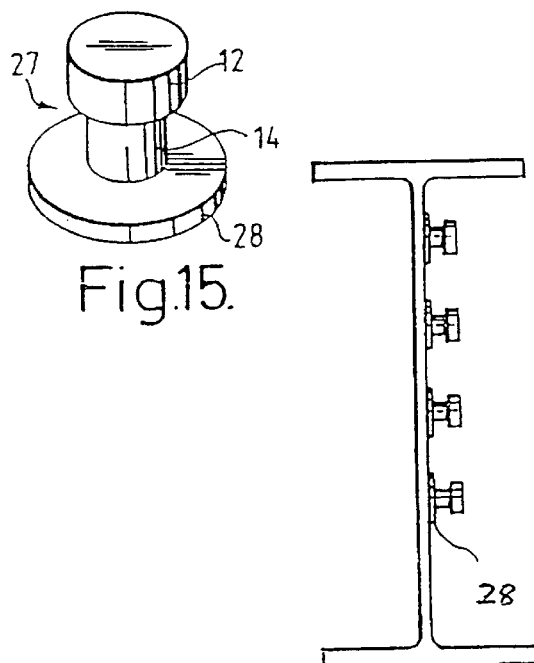
Fig.15.
Fig.16.
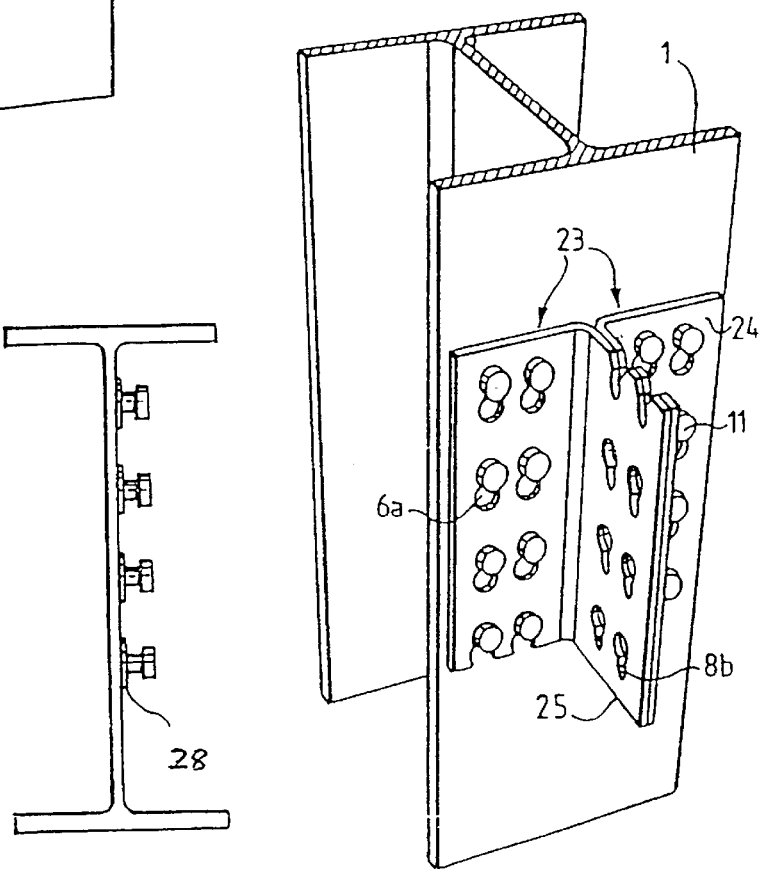
Fig.14.

CONNECTING APPARATUS

The present invention relates to apparatus for connecting load bearing structural members and more especially, but not exclusively, to apparatus for connecting beams, columns and other like structural members. The invention also relates to a method of connecting such members.

Conventional steel support structures or frameworks are fabricated from preformed beams, columns and like structural members. Typically, beams carry welded brackets which are aligned with preformed holes formed in columns, the beams and columns then being joined by bolts or like connecting devices. Similarly, for connecting secondary beams to primary beams, steel brackets welded to the webs of the secondary beams are aligned with holes preformed in the webs of primary beams (or vice versa), the beams then being connected by through bolts or the like. The provision of these brackets and holes adds cost to the manufacturing process and the subsequent on-site alignment and securement can be time consuming and expensive.

It is known to provide modular supporting structures wherein upright structural members are provided with one or more slots which receive projections of horizontal structural members. Such supporting structures are disclosed in, inter alia, U.S. Pat. No. 5,592,789, Patent Applications GB-A-1051557 and GB-A-1240774. A framework assembly is known from U.S. Pat. No. 3,513,606 in which right angled brackets are mounted to a vertical frame member by virtue of a slotted adaptor bracket secured to the frame member by a spring loaded nut and bolt assembly.

Such structures and assemblies suffer from a number of disadvantages.

U.S. Pat. No. 3,977,801 discloses a device for laterally interconnecting structural members such as beams and columns. The device comprises a plate with a face and a circumscribing edge, at least one slot extending inwardly from one edge of the plate and at least one stud extending outwardly from the face of the plate. The plate is fixed vertically by welding to an end of a beam whereby the stud or studs extend into open-ended slots formed in the opposed end of the column (or a second plate portion welded to one face of the column) with suitably positioned studs extending outwardly from the opposed face of the column (or separate plate portion) extending into the open-sided slots of the plate.

Use of such a device involves a significant amount of welding to achieve the required column to beam or beam to beam connections, this being both costly and time consuming.

It is an object of the present invention to provide apparatus for and a method of connecting columns, beams and like structural members which avoids, or at least alleviates, structural and other disadvantages inherent in support members formed with connection slots as discussed previously, and which can be assembled and dismantled with relative ease.

In one aspect, the invention provides a connector for providing a load supporting connection between first and second structural members, the connector comprising a flange for connection to one of the two structural members and a web which subtends an angle to the flange and is formed with at least one slot bordered on all sides by web material and includes a head and a neck coextensive with the head.

The flange may be formed with a series of slots each of which includes a head and a neck coextensive with the head. In a preferred embodiment, the width of the neck is less than that of the head.

According to the present invention in another aspect, there is provided a connector for providing a load supporting connection between a first structural member (the "supporting member") and a second structural member supported thereby (the "supported member"), the connector comprising a flange and an integral web formed with an array of two or more spaced slots, each having an upper portion dimensioned to receive a head of a stud which projects from a surface of the supported member and a coextensive lower portion dimensioned to receive the shank of the stud, the width of each shank receiving slot portion being less than the width of the respective stud head.

The flange of the connector may also be formed with an array of two or more spaced slots each dimensioned to receive a head of a stud which projects from a surface of the supporting member and a coextensive upper portion dimensioned to receive the shank of the stud.

Preferably, each array comprises two or more generally vertically spaced slots.

According to the present invention in a further aspect, there is provided an assembly of a connector and first and second structural members, the connector providing a connection between the structural members and comprising a flange and a web formed with an array of two or more spaced slots each having an enlarged upper portion and a coextensive narrower lower portion, the enlarged portions of each slot being dimensioned to receive a head of a stud which projects from the surface of a first structural member to be connected and the narrower portion of each slot being dimensioned to receive the shank of one such stud and to trap the head of that stud behind the margins of the slot narrower portions thereby to connect the structural members together.

The flange may also be formed with an array of two or more spaced slots each having an enlarged lower portion and a coextensive narrower upper portion.

Preferably, each array comprises two or more generally vertically spaced slots.

In a still further aspect, the invention provides an assembly comprising first and second structural members and a connector providing a load supporting connection between the first structural member and the second structural member to be supported thereby, each such member having projecting from at least one surface a series of studs each having a shank secured to the respective structural member and a head, the connector comprising a flange and a web which subtends an angle to the flange, a series of slots formed in the web each comprising at least two generally vertically spaced slots each of which includes a head and a coextensive neck, each slot being dimensioned to allow the head of a stud to pass therethrough and each slot neck being dimensioned to receive the shank of a stud.

In a yet further aspect, the invention provides a connector for providing a load supporting connection between first and second structural members, the connector comprising a flange formed with a series of slots and a web which subtends an angle to the flange and is also formed with a series of slots, each such series comprising at least two slots one above the other, and each slot including a head and a narrower neck coextensive with the head, each slot of the flange being positioned with its head below its neck and each slot of the web being positioned with its head above its neck.

The term "stud" as used herein refers to a member which projects from or through a surface of a beam, column or like structural member and comprises a head located at one end of a shank.

The term "generally vertical" as used herein with reference to the slots of an array or series means that one such slot is positioned above another slot or slots of the array or series. The term embraces situations in which one slot is positioned above but to one side of another slot or slots.

Preferably, the studs project horizontally, or substantially horizontally, from each structural member.

The shanks of the studs are typically secured to the respective structural member by welding. Alternatively, the shank may pass through a suitably dimensioned hole formed in the respective structural member, the shank being secured in place by a bolt screwed onto a threaded end of the shank. In this arrangement, the shank may include a collar whose end abuts the margin around the stud head formed in the member and acts to space the stud head from the member. Other securement means maybe provided. Preferably the studs are shear studs and are formed of steel, for example plain carbon steel or galvanised steel.

Shear studs are preferably evenly spaced, along all or part of the length and/or width of the respective structural member. Typically the studs will be aligned substantially vertically or horizontally along all or part of the span of the structural member. The studs may be of equal length.

The length of each stud shank is generally dependant upon the physical properties of the connector and/or the plate from which the connector is produced. Preferably, the length of each stud shank is only marginally greater than the wall thickness of the connector. Typically, the shank length is up to several millimeters greater than the thickness of the plate from which the slot is cut, for example up to 5 mm greater, preferably between 1 and 3 mm. Typically, the length of each stud shank will be between 6 and 26 mm, the respective plate thickness being between 5 and 25 mm. A typical plate thickness is between 10 and 20 mm.

The shank diameter is generally dependent on the load to be supported by the connector. Typically, the shank diameter is between 5 and 50 mm, preferably between 10 and 30 mm, for example 19 mm.

In a preferred embodiment, the slots are keyhole shaped. By the term "keyhole" is meant a slot having a necked portion which is coextensive with an enlarged head portion. The margins of the head and necked portions of the slots may be curvilinear. The head portion of the slot is sufficiently large to receive the head of a stud. Typically, the diameter of the enlarged head portion of the slot is between 0.5 and 3 mm larger than the diameter or width of the stud head.

The necked portion of the slot is typically shaped to engage with (or be marginally spaced from) the sides of the shank of the stud. Typically the width of the necked portion of the slot is between 0.5 and 3 mm larger than the stud shank diameter.

The shapes of the slots and the cross sections of the stud heads and shanks are preferably circular, although other shapes may be adopted. Thus, the stud head and the enlarged portion of the slot may, for example, be round, square, triangular shaped or any other appropriate shape.

The structural members are generally profiled sections of cold-rolled or hot-rolled steel and typically comprise "H" section columns and "I" section beams. Preferably, the structural members are hot rolled columns and beams.

Preferably, the beams, columns, structural members and connectors are produced from steel. Other materials having the required physical properties may however be employed.

The connector may comprise an angle plate comprising a flange and an integral web set generally normal to one another. Preferably, the connector comprises an angle plate of "L" or "T" section. Alternative connector sections may, however, be employed. The angle between the flanges is typically between 60° and 120°; preferably the angle is 90°.

The connector may be formed from lengths of hot or cold-rolled steel, typically of I-section. T-sectioned connectors may be formed by splitting I-sectioned or H-sectioned profiled lengths of rolled steel. In a preferred form, the connectors are produced from lengths of hot-rolled steel. Alternatively, the connectors may be formed from steel strip with stamped-out slots and then folded by cold forming to produce an "L" section.

Alternatively, the connector may be produced from steel plates in which the required slots are formed, for example by flame cutting or a stamping process, the plates then being welded together to produce the required "T" or "L" section.

In one embodiment the connector comprises a metal angle plate including a flange and an integral web each formed with an array of generally vertically spaced keyhole-shaped slots, the slots of the flange being inverted relative to the slots of the web.

In this embodiment, the keyhole slots of the flange each have an enlarged lower head portion for receiving the head of a shear stud and a coextensive narrower upper neck portion for engaging the shank of the shear stud to effect a first connection between the connector and a supporting column or primary beam whereby the connector, sensu lato, is supported by the supporting column or primary beam. The connector, sensu stricto, "hangs from" the studs of the supporting column or primary beam.

The slots of the web effect a second connection between the connector and a beam supported by the supporting column or primary beam whereby the connector, sensu lato, supports the supported beam. Essentially the connector, sensu stricto, provides a "hanger" which supports the supported or secondary beam.

The slots may be formed in the connector by flame cutting, stamping or other suitable process.

In another embodiment, the connector comprises a metal angle plate including a flange and an integral web, the web only being formed with an array of generally vertically spaced key-hole slots. In this embodiment, the flange is secured to the supporting member by bolts, welding or the like with the slots of the web effecting a second connection between the connector or a supported member.

In another aspect, the invention provides an assembly of a first structural member (the "supporting member"), a second structural member supported thereby (the "supported member") and a connector for providing a load bearing connection between the two structural members, a plurality of studs projecting from at least one surface of the supported member, each stud including a shank secured to the supported member and a head, the connector comprising a flange and a web formed with a series of generally vertically spaced slots each of which includes a head and a restricted neck positioned below and coextensive with the head, the slots being dimensioned and sited to enable the heads of studs which project from the surface of the supported member to pass through the heads of the slots of the connector web with the stud shanks being received within the necks of the slots, the arrangement being such that on assembly the rear face of the flange makes contact with or lies adjacent to an abutting face of the supporting member and the rear face of the web lies adjacent to or makes contact with an abutting face of the supported member.

The flange may be bolted, welded or otherwise secured to the supporting member.

Alternatively, a plurality of studs may also project from at least one surface of the supporting member, each stud including a shank secured to the supporting member and a head; in this embodiment, a series of generally vertically spaced slots are formed in the flange, each such slot including a head and a restricted neck positioned above and coextensive with the head, the slots being dimensioned and sited to enable the heads of the studs which project from the surface of the supporting member to pass through the heads of the slots of the connector flange with the stud shanks being received within the necks of the slots.

In a yet further aspect, the invention provides a method of providing a load bearing connection between a first structural member and a second structural member supported thereby, the method comprising the steps of securing to at least one face of each structural member a plurality of studs each having a shank and a head, supporting on the studs of the first structural member a connector which includes a flange formed with a plurality of slots each having a head and a coextensive neck positioned above the head, the heads of the studs of the first member passing through the slot heads of the flange with the stud shanks being received within the flange slot necks, the connector also including a web formed with a plurality of slots each having a head and a coextensive neck positioned below the head, the heads of studs of the second structural member passing through the slot heads of the web with the stud shanks being received within the slot necks.

The invention will now be described by way of example only with reference to the accompanying diagrammatic drawings in which:

FIG. 13 shows an assembly of a column, a beam and cold formed connectors similar to that illustrated in FIGS. 11 and 12;

FIG. 14 shows the assembly of FIG. 13 with the beam removed;

FIG. 15 is a perspective view of an alternative shear stud in accordance with the invention;

FIG. 16 is a section taken through a beam from one web face of which protrudes an array of connectors as illustrated in FIG. 15;

In each of the embodiments described, like parts have been given the same reference numerals.

Figure 1:
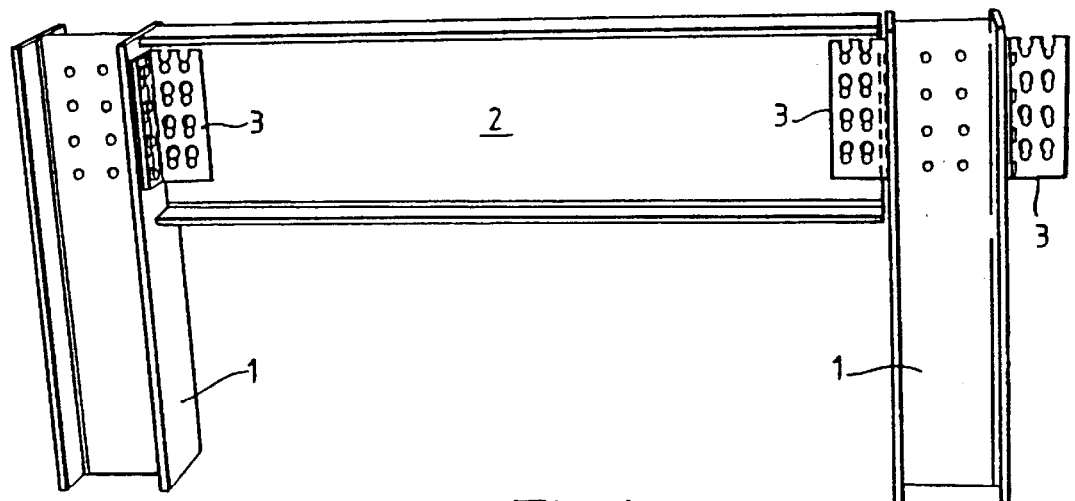
FIG. 1 illustrates a beam supported between columns, the beam and columns being joined together by connecting apparatus in accordance with the invention.
Figure 2:
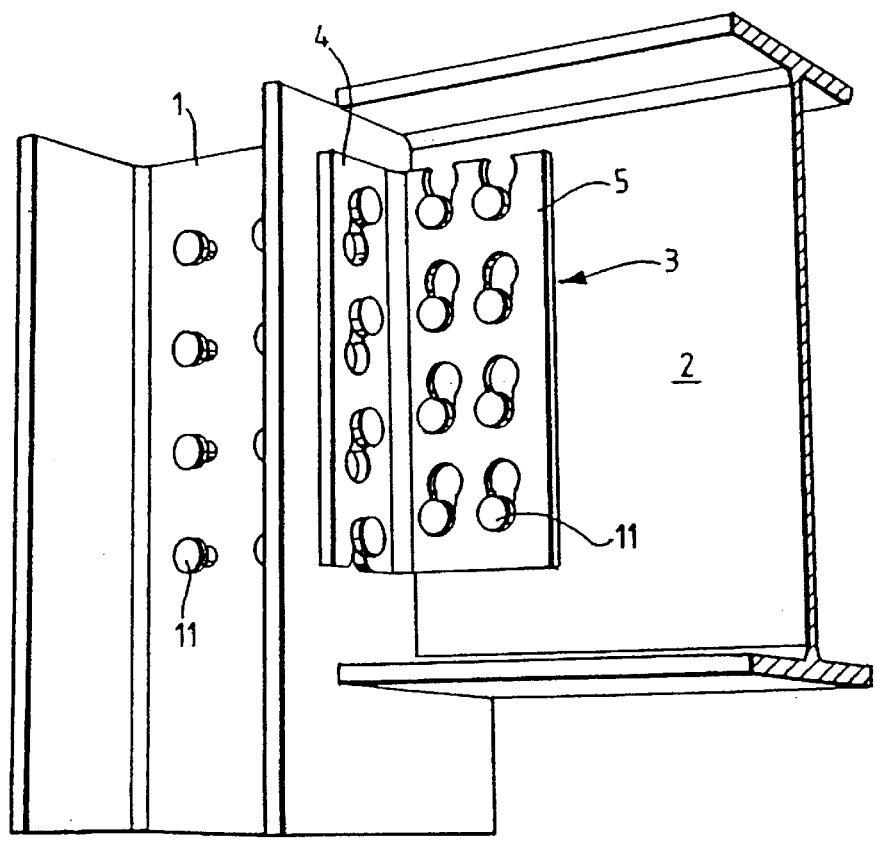
FIG. 2 illustrates a part of the assembly of FIG. 1 in perspective to an enlarged scale.
Figure 3:
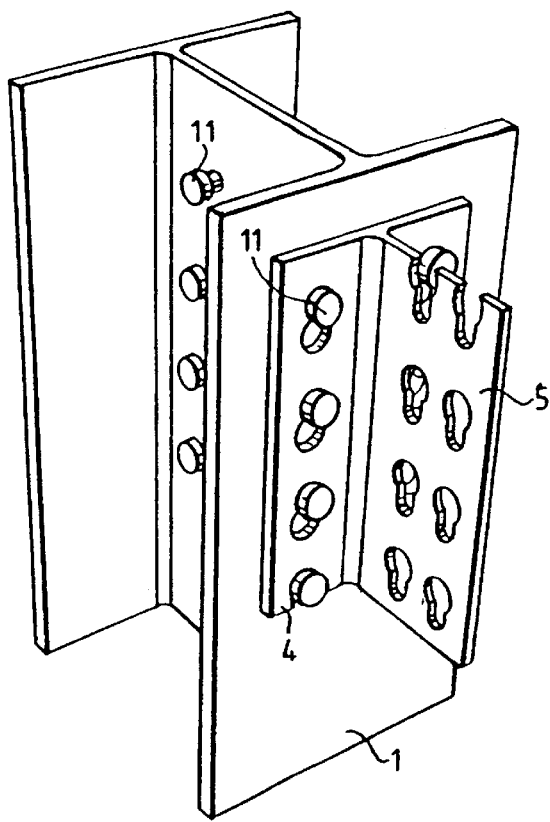
FIG. 3 illustrates the assembly shown in FIG. 2 but with the beam removed.
Figure 4:
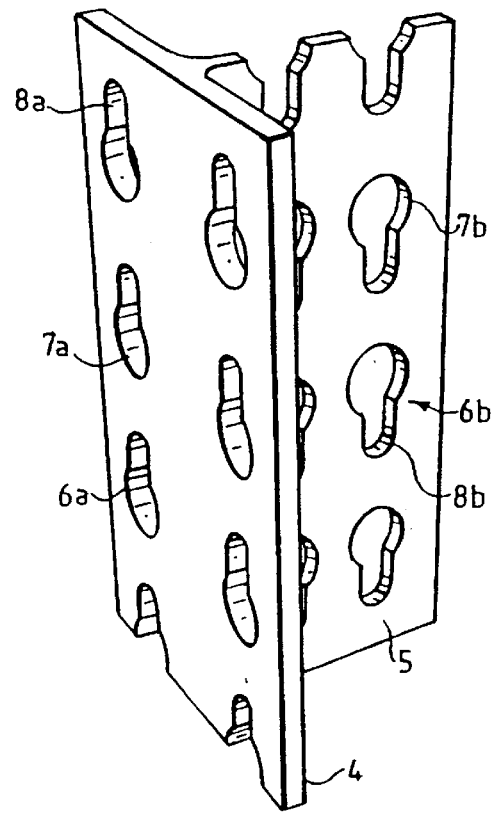
FIG. 4 illustrates a perspective view of the connector illustrated in FIG. 2 showing the rear face of the flange of the connector.

FIGS. 1 to 4 illustrate a pair of hot rolled H-sectioned steel columns 1 supporting an hot rolled I-section steel beam 2 through hot rolled steel connectors 3 in accordance with the invention. Thus, the columns 1 define supporting members for supporting the beam 2, the supported member. The connectors 3 may be produced from materials other than steel which exhibit the required physical properties; alternatively, they may be produced from cold rolled steel plate. As will be seen more clearly from FIGS. 3 and 4, each connector 3 is of T-section and includes a flange 4 and an integral web 5. The term "flange" refers to that connector part which connects or is connected to a supporting member and the term "web" refers to that connector part which connects or is connected to a supported member.

In the embodiment illustrated in FIGS. 1 to 4, the web 5 lies generally normal to the flange 4 and is positioned midway along the flange length. Other configurations of connectors are possible, some of these being discussed below. Two arrays or series of generally vertically spaced slots 6a, 6b are formed in the flange and web respectively. As shown, each slot is of keyhole shape. As discussed below, this need not always be the case. The slot arrays 6a are positioned one to each side of the web 5. Each slot 6a, 6b has an arcuate head 7a, 7b and a coextensive neck 8a, 8b respectively. The closed end of each slot neck 8a, 8b is arcuate. For the slots 6a of the flange, each neck 8a is sited above the respective head 7a; for the slots 6b of the web, each neck 8b is sited below the respective head 7b. Thus the slots of the web are inverted with respect to the slots of the flange. More or less than two arrays of slots 6a, 6b may be provided in the flange and/or the web.

The connectors 3 may be cut to length from lengths of hot-rolled steel of an appropriate profile. The required T-section may be produced by splitting a hot-rolled I- or H-section in two. The slots 6a, 6b may be formed as a continuous process in the flange and web by flame cutting, stamping or other suitable process. Cutting to length can lead to the upper slots of any given array of the web 5 being open (see for example the upper slots 6b of the web 5). Similarly, the lower slots of any given array of the flange 4 may be open (see for example the lower slots 6a of flange 4).

Alternatively, the connectors 3 may be produced from steel plates in which the required slots are formed, for example, by a flame cutting or stamping process, the plates then being welded together to produce the required "T" or "I" section.

Figure 6:
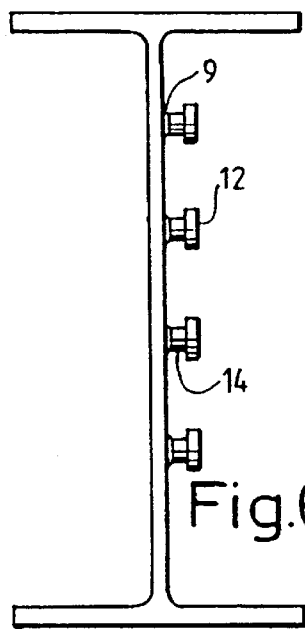
FIG. 6 is an end view of a beam similar to that illustrated in FIG. 1 showing more clearly the shape of the shear studs which protrude from one side surface of the beam web.
Figure 7:
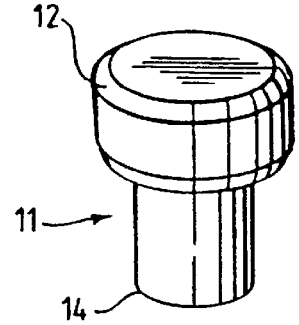
FIG. 7 is a perspective view of one of the shear studs illustrated in FIG. 6.

Arrays of generally vertically spaced shear studs 11 protrude from the adjoining faces of the columns 1 and beam 2. Typical shear studs are illustrated in FIGS. 6 and 7. Each shear stud comprises a head 12 dimensioned to pass through a slot head 7a, 7b and a shank 14 dimensioned to be received within the neck 8a, 8b of the slots 6a, 6b. Preferably, the slot dimensions are only marginally greater than the respective dimensions of the shear studs.

As shown, arrays of shear studs protrude from the webs and flanges of the columns and/or beam. Many of these may not be required for a given assembly but their presence means that individual columns and beams can be used for a variety of different assemblies.

Figure 5:
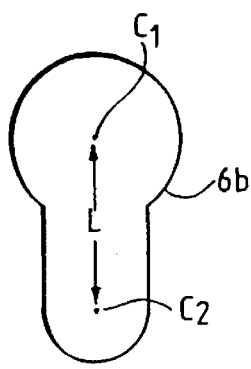
FIG. 5 illustrates the shape of the slots formed in the flange and web of the connector.

A preferred keyhole shaping of the slots 6a, 6b can be clearly seen from FIG. 5. The slot 6b illustrated is taken from the web 5. The shape of each slot 6a will be the same as that for each slot 6b, but inverted. The centres of curvature of the head and neck lower end are referenced $C_1$, and $C_2$ respectively. The centres of curvature $C_2$ of the necks of neighbouring slots of the flange and web lie in a common horizontal plane. The distance between the centres of curvature $C_1$, and $C_2$ is indicated by reference "L". The distance L affects the tensile capacity of the connection. If distance L is small, the tensile or pull-through capacity is low; however more studs can be accommodated in a given length of flange or web. Alternatively, if distance L is large, fewer slots can be accommodated but the tensile capacity of the connection is higher.

Other keyhole shapes may be employed, one criterion being that a neck portion which is coextensive with an enlarged portion.

The transverse positions of the slot centre-lines $C_1$, $C_2$ of the web affects the stresses induced in the flange, and shear studs connected to the flange. The reaction imposed onto the web of the connector is off the back face of the flange. This reaction causes a moment that is resisted by tensile forces in the top rows of shear studs on the supporting member, and by compressive forces at the base of the angle plate of the flange of the connector. Increasing the distance between the web slot centre-lines and the back face of the flange creates a corresponding increase in these stresses, whilst the vertical shear stresses remain largely unchanged. Thus, it is preferable to keep the distances between the slot centre-lines $C_1$, $C_2$ of the web of the connector and the back face of the flange at a minimum. The shear studs on the web of the supported member should not be so close to the end of the member that they compromise the integrity of the connection, causing among other things buckling of the web of the supported member.

As illustrated in FIGS. 6 and 7, each stud head 12 and shank 14 is circular in cross-section. Other head and shank cross-sections may, however, be employed. The diameter of each shank 14 is marginally less than the width of the necks 8a, 8b of the keyhole slots 6a, 6b and the diameter of each head 12 is marginally less than the diameter of the heads 7a, 7b of the slots, but greater than the width of the slot necks. The shanks 14 are typically secured to the structural member by welding. Other securement methods may, however, be employed. In FIG. 6, the welds are referenced 9. As shown, these include fillets which stand proud of the beam web to which they are secured. Welding processes which do not result in the formation of weld fillets may be employed.

In use, connectors 3 are supported on the shear studs 11 which project from the supporting columns 1, with the stud shanks 14 positioned within and in contact with the upper margins of the slot necks 8a and 8b. The rear face of each connector now lies in contact with or is closely adjacent to the adjoining face of the abutting column. Once the connectors are positioned on the studs 11 of each column, the beam 2 is moved into position with its outwardly projecting studs opposite the slots 6b of the web. The heads 12 of the studs 11 which protrude from the beam are introduced into the slot heads 7b and the beam 2 is moved downwardly until the stud shanks 14 are positioned in contact with the lower margins of the necks 8b.

Complementary holes may be drilled or otherwise formed in the supporting and supported members to assist alignment during assembly.

The load paths from the beam 2 to each column 1 is through the shear studs welded to the beam web to the web 5 and flange 4 of the respective connector, and through the shear studs welded to the flange of the column 1 and thence to the column 1.

It will be appreciated that the size and proportions of the dimensions of the connectors and the keyhole slots will affect the strength of possible failure mode governing the strength of the connection achieved.

The length of the connector is essentially restricted by the space available between the flanges of the supported member.

If it is necessary to increase the shear capacity of a connector, additional slots and shear studs can be accommodated by additional rows of slots. For example, four rows of slots can be formed on one or each flange of the connector.

The diameter of the shank of each shear stud is typically 19 mm, although the exact diameter selected will depend on the capacity of the connection required. For connecting hot rolled steel sections together, it is unlikely that the shank diameter would be less than 10 mm. In some cases, however, the shank diameter may be between 5 and 50 mm or between 10 and 30 mm or between 15 and 25 mm. The ratio between the head diameter and the shank diameter affects the capacity to resist load without pulling-through the slot. Significant tensile forces will develop in the top shear studs located on the supporting steelwork, due to the eccentrically applied load from the supported steel. These tensile forces will require a stud head of a significantly larger diameter than the shank diameter in order to prevent a pull-through failure adversely affecting the load capacity of the connection. Experimental testing is a reliable method of establishing a suitable ratio between head diameter and shank diameter for the shear studs.

The shear studs will typically be formed from the same or similar material to that of both the supported structural member and the connector. The shear studs have to be strong enough to prevent the bearing stresses imposed by the connector causing a bearing failure of the studs.

As mentioned previously, connecting apparatus in accordance with the invention is intended to be used primarily for connecting hot-rolled steel sections, for example multi-storey braced frames. Since the connections will have a relatively poor ability to resist moments, it is not presently envisaged that the connection would be used in unbraced frames.

Figure 8:
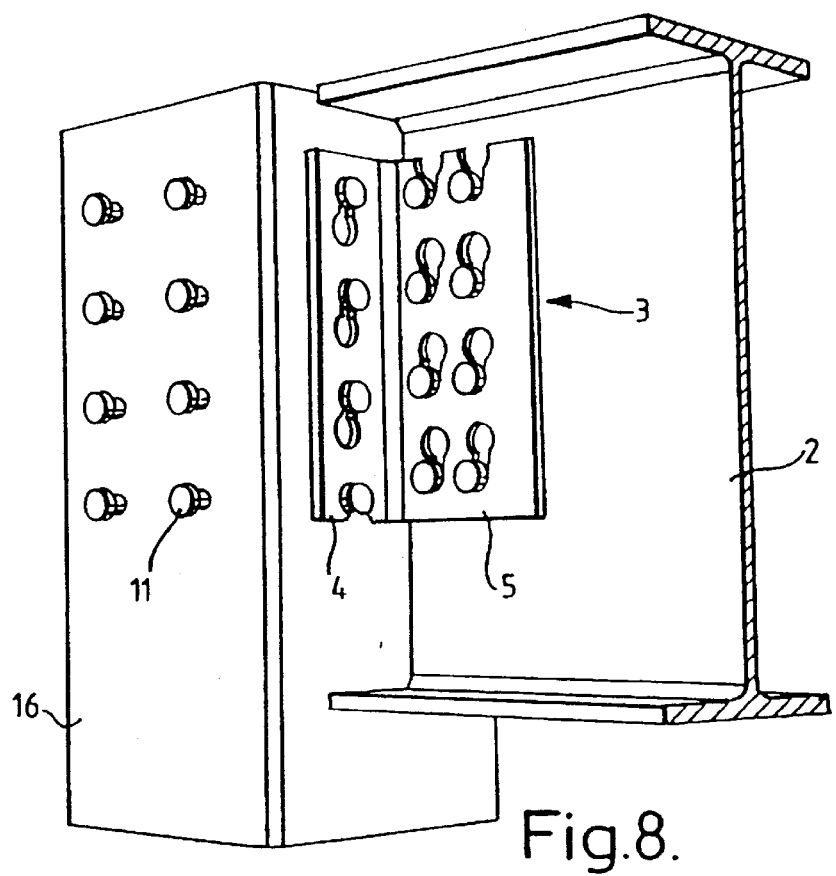
FIG. 8 shows a similar connecting apparatus to that illustrated in FIGS. 1 to 4 but joining a beam to a square hollow section column.

Turning now to FIG. 8 of the drawings, the connector 3 is employed to join the beam to at least one structural wall element 55 of a hollow generally square section column 16. The column has shear studs 11 protruding from each of its structural wall elements 55 thereby enabling a multiplicity of beams to be supported thereby. Otherwise, the assembly is essentially the same as that illustrated in FIG. 2.

Figure 9:
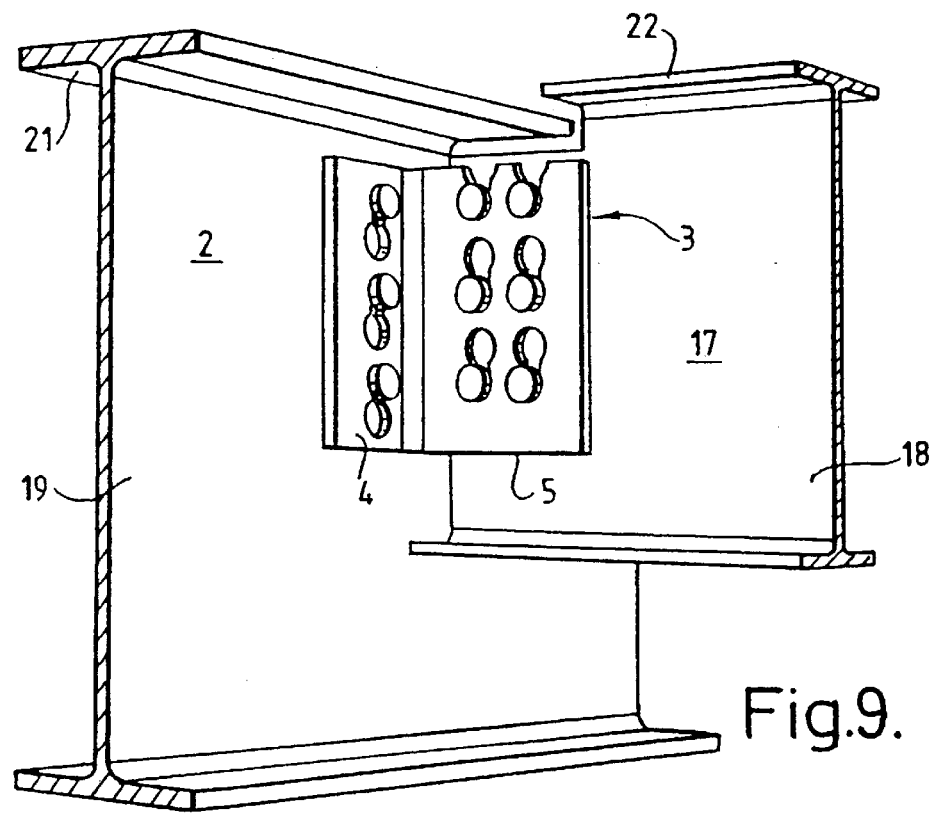
FIG. 9 is a perspective view of an assembly of a primary beam supporting a secondary beam, the beams being joined by connecting apparatus in accordance with the invention.

The assembly illustrated in FIG. 9 comprises a secondary beam 17 (the supported member) whose web 18 is joined via a connector 3 to the web 19 of a primary beam 2 (the supporting member). To accommodate the upper flange 21 of the primary beam 2, the end of the flange 22 of the secondary beam 17 is partially removed.

Figure 10:
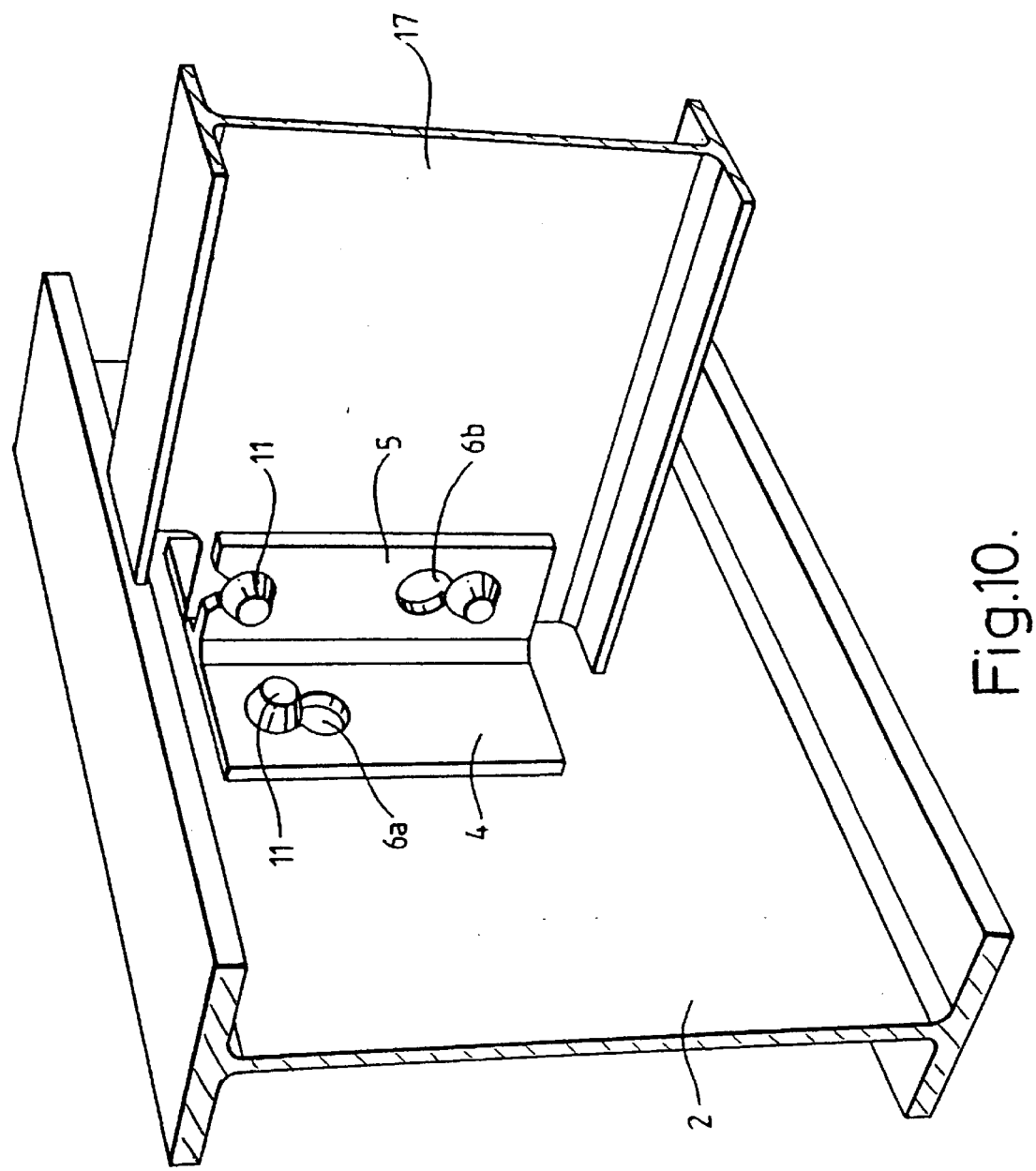
FIG. 10 is a perspective view of an alternative connector in accordance with the invention providing a beam to beam connection.

FIG. 10 illustrates a relatively low strength beam to beam connection in which the number of slots 6a and studs 11 is reduced to a minimum. In this embodiment, each flange 4 is formed with two slots one each side of the flange to web junction with the web 5 having two slots 6b, only the lower one being bordered on all sides by web material.

Figure 11:
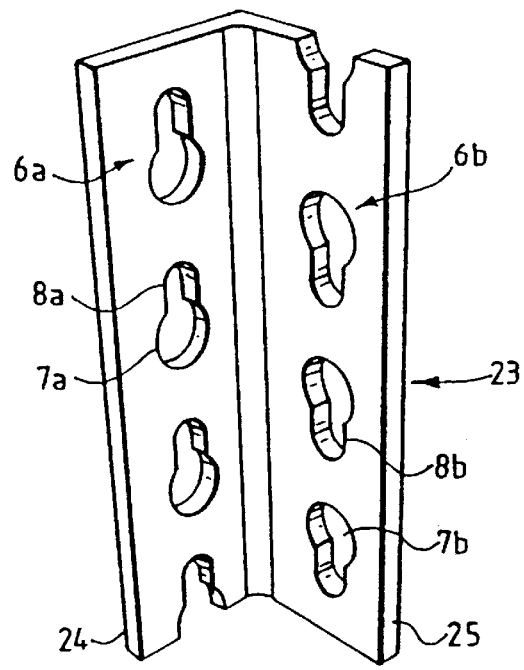
FIG. 11 illustrates an alternative L-section hot rolled connector in accordance with the invention.

An alternative L-section connector 23 is illustrated in FIG. 11. Connector 23 comprises a flange 24 and integral web 25. The flange and web are each formed with a single array of slots 6a, 6b, each slot having an arcuate head 7a, 7b and a coextensive neck 8a, 8b. As for the previously discussed embodiments, for the slots 6a of the flange each neck 8a is sited above the respective head 7a; and for the slots 6b of the web, each neck 8b is sited below the respective head 7b. Thus, as before, the slots of the web are inverted with respect to the slots of the flange. More than one array of slots 6a, 6b may be provided in the flange and/or the web.

The connector 23 may be cut to length from lengths of steel strip and then hot rolled or cold-formed by folding to the required L-section. The connector shown in FIG. 11 has been cut to length from hot-rolled angle section. The slots are formed before the connector is cut to length.

Figure 12:
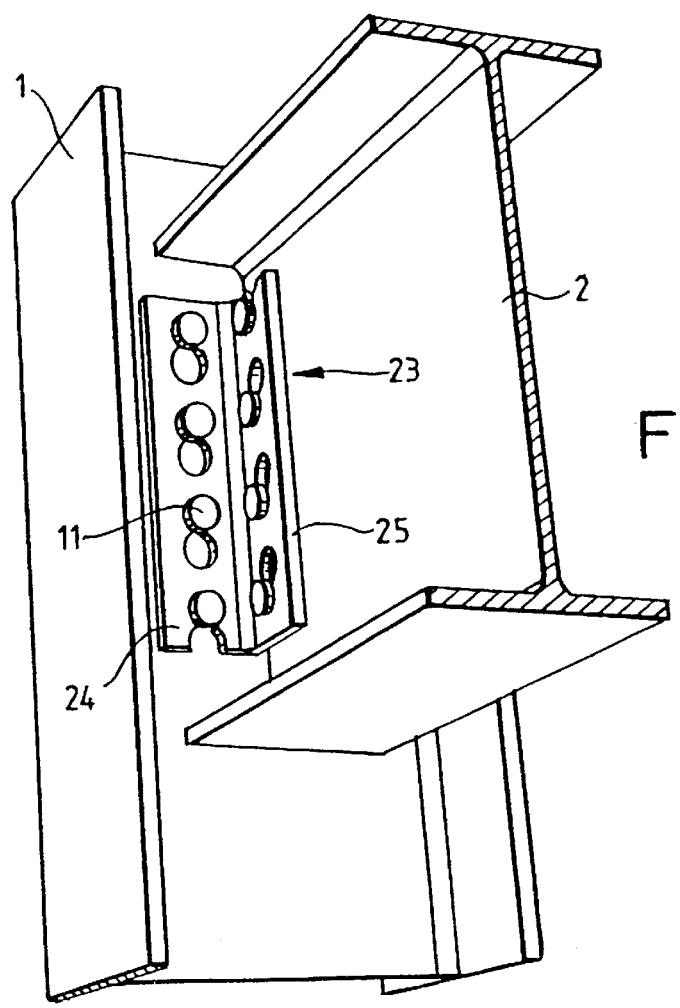
FIG. 12 is a perspective view of an assembly of a column, a beam and the alternative connector illustrated in FIG. 11.

FIG. 12 shows the connector 23 of FIG. 11 providing a connection between a web of a supporting column 1 and a web of a supported beam 2. As for the previous embodiments, the slots 6a of the flange 24 locate over protruding studs 11 welded to the web of the column 1 with the stud shanks positioned in contact with the arcuate ends of the necks 8a, and the protruding studs of the beam web positioned in contact with the arcuate ends of the slot necks 8a of the web 25. The arcuate neck portions of neighbouring slots of the flange and web lie in common generally horizontal planes.

Turning now to FIGS. 13 and 14, two L-section connectors 23 are positioned side-by-side to define a joint between a supporting column 1 and a supported beam 2. The connectors are mirror images of each other. In this embodiment, the flange 24 and web 25 of each connector 23 have two generally vertically spaced arrays of slots 6a, 6b. The arrays of shear studs 11 which protrude from one outer flange surface of the column 1 support the flanges of the connectors 23 such that the slots 6b of the connector webs 25 are aligned. The shear studs of the beam web pass through and are supported within the necks 8b of the slots 6b of the adjoining connector webs 25. Clearly, the shank lengths of these studs have sufficient length to enable the stud heads to locate over the web margins alongside the slot necks. In FIG. 13, rows of studs 11 can be seen protruding from the web of the column 1.

An alternative shear stud 27 is illustrated in FIG. 15. As for the shear studs 11 discussed above, the stud 27 has a head 12 and shank 14. In this embodiment, however, the end of the shank 14 remote from the head carries or is formed with an end disc 28 which, as can be seen from FIG. 16, seats against the column or beam surface to which it is secured. The end disc 28 functions to reduce high bearing stresses occasioned by weld between the shear studs described previously and the section to which it is secured.

Figure 17:
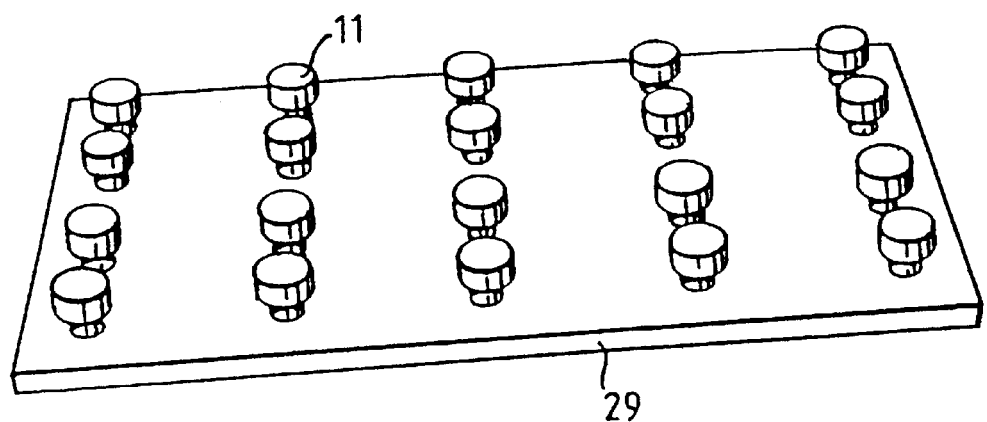
FIG. 17 illustrates an array of shear studs secured to a pad for subsequent bonding to a structural member.
Figure 18:
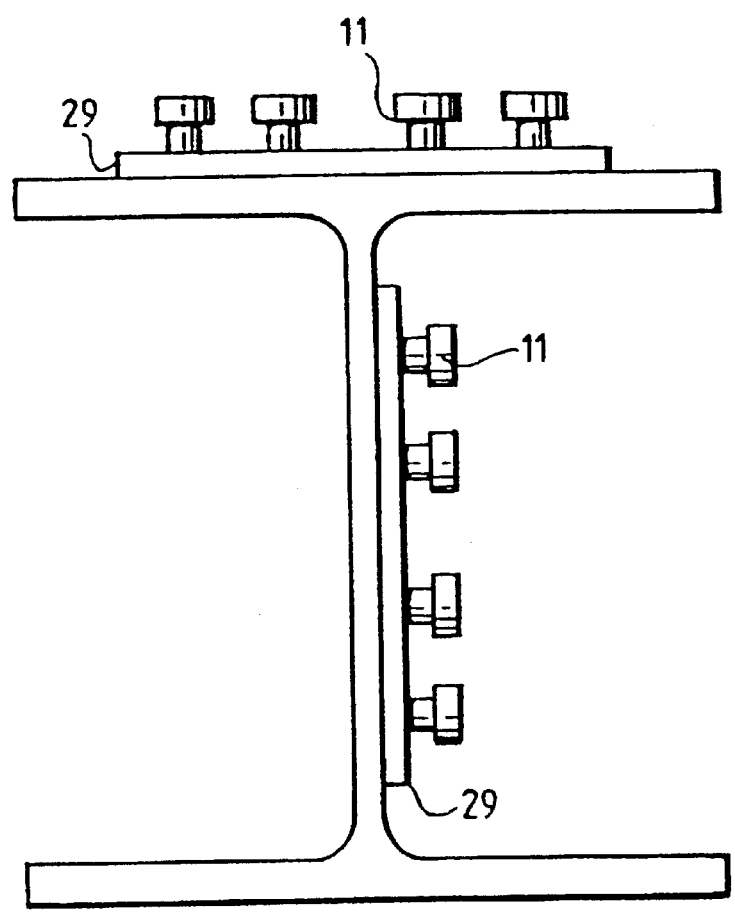
FIG. 18 shows pads as illustrated in FIG. 16 bonded to the flange and web of a column.

FIGS. 17 and 18 illustrate an alternative method of securing the required stud arrays to the flange or web surfaces of the supporting and supported structural members. In this embodiment, the studs 11 are welded to steel plates 29 which are in turn welded to the respective surface or surfaces of the column or beam. Other means of securing the plates 29 to the structural members may be employed.

Figure 19:
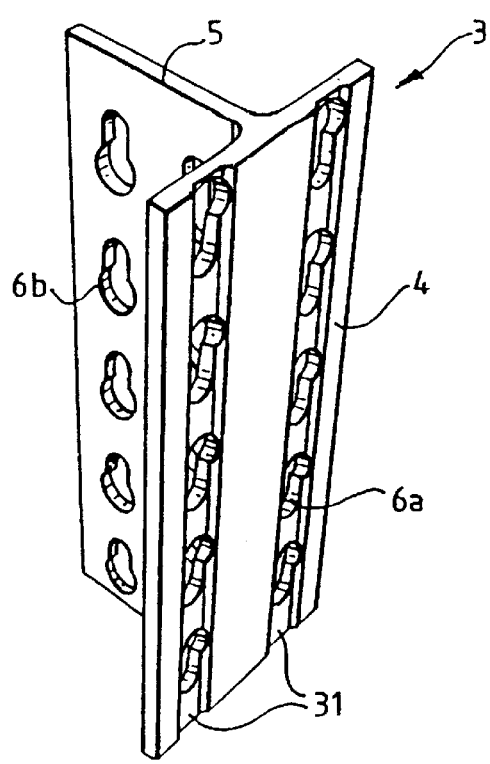
FIG. 19 is a perspective view of an alternative connector in accordance with the invention.

Turning now to FIG. 19, it will be seen that the rear face of the flange 4 of the illustrated T-section connector 3 is formed with two channels 31 which overlie the slot arrays 6a. The dimensions of the channels 31 are sufficient to receive the fillets of welds 9 (see FIG. 6) between the shear studs 11 and the supporting member from which they protrude, or the end discs 28 (see FIG. 15) thereby enabling the rear face of the connector flange to make good contact with the adjoining face of the supporting member. Similar channels may be provided in one or both faces of the web 5. When welding processes which do not produce raised fillets are employed, the channels 31 are not necessary.

Figure 20:
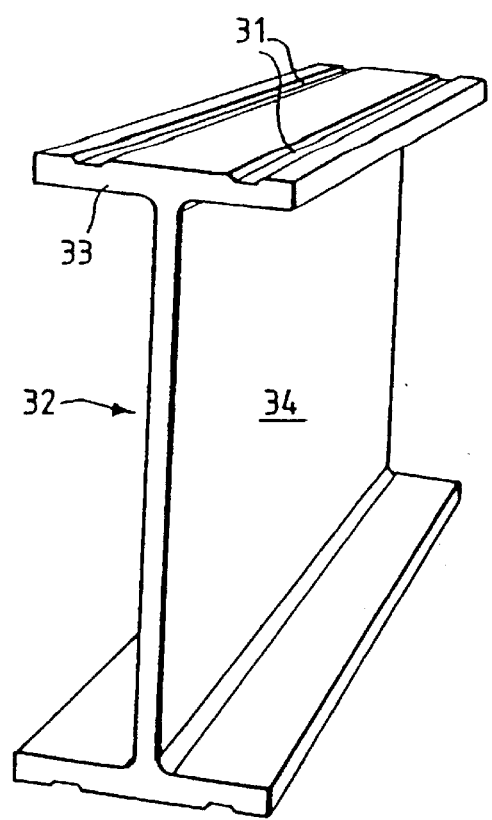
FIG. 20 is a perspective view of a T-section plate from which the connector of FIG. 19 is produced.

FIG. 20 illustrates a hot rolled steel I-section 32 from which the connector illustrated in FIG. 19 is produced. As will be seen, the channels 31 are rolled or otherwise formed in the outer face of each flange 33 of the section 32. The section is split along its web 34 to produce two connector pieces, the required slots 6a, 6b being stamped, flame cut or otherwise formed in each flange and web.

Figure 21:
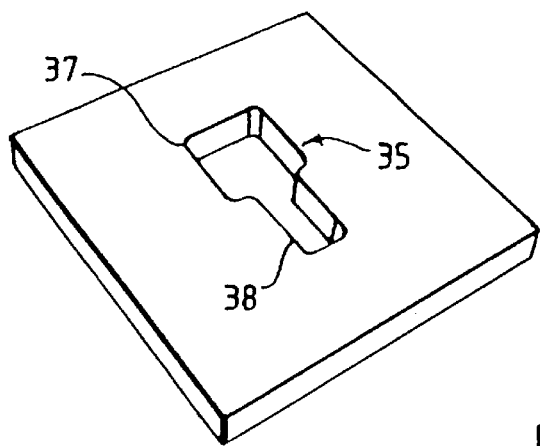
FIGS. 21 and 22 are respectively perspective views of alternative slots and studs in accordance with the invention.
Figure 22:
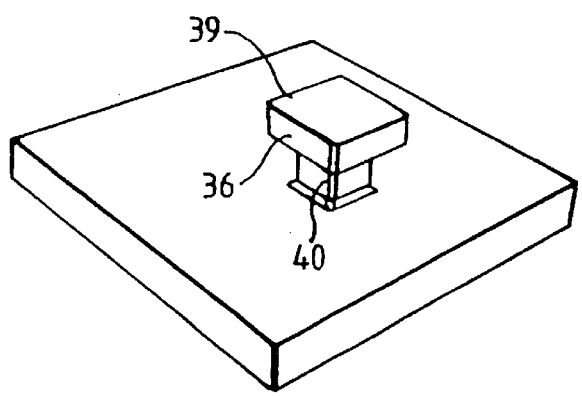

An alternatively shaped keyhole slot 35 and shear stud 36 are illustrated in FIGS. 21 and 22 respectively. In this embodiment, the slot 35 has a generally square shaped head 37 and a coextensive generally flat-ended neck 38. The stud 36 has a complementary generally square shaped head 39 and a similarly shaped shank 40. These are only examples of various slot and stud shapes that can be employed.

Figure 23:
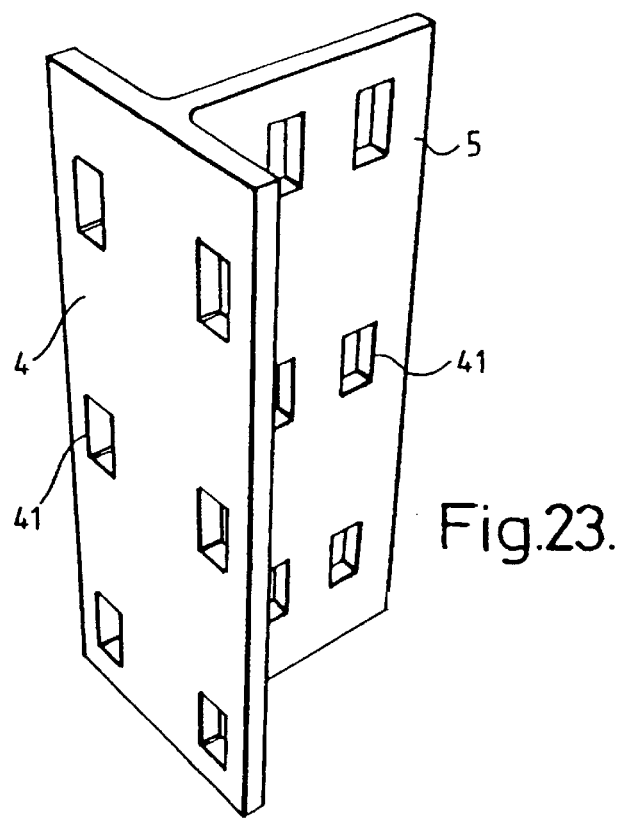
FIG. 23 illustrates an alternative connector in accordance with the invention.

The connector illustrated in FIG. 23 is of "T" section and differs from the connectors illustrated in earlier Figures in that its slots 41 are generally parallel sided, the width of the head being the same or substantially the same as the width of the neck. The corners of the slots may be rounded or squared as illustrated. As shown, slots 41 are formed in both the web 5 and flange 4. The slots formed in the flange 4 may be replaced by through-holes to receive bolts as will be described below in relation to FIG. 26. Alternatively, the flanges 4 may be welded to the respective supporting member.

Figure 24A:
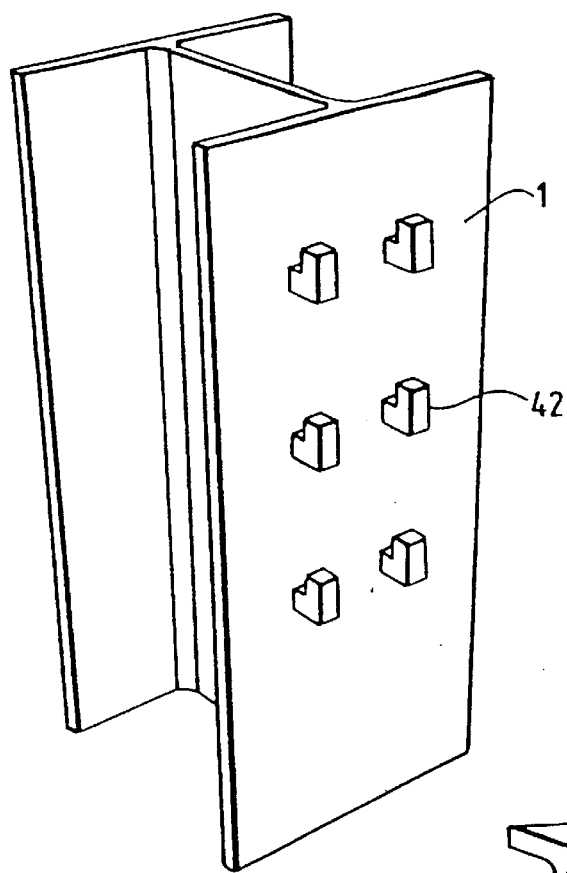
FIGS. 24A and 24B are perspective views of a supporting column and supported beam with modified studs to receive the connector of FIG. 23.
Figure 24B:
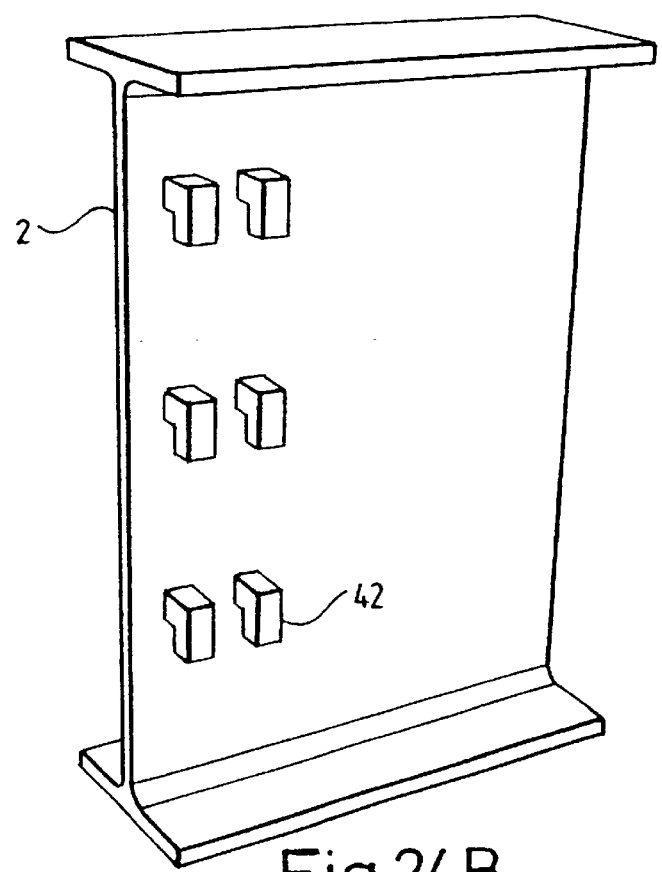

To accommodate the generally parallel sided slots, hook-shaped studs 42 as illustrated in FIGS. 24A and 24B are employed.

In FIG. 24A the studs 42 are shown welded to a supporting column 1 and in FIG. 24B to a supported beam 2. As will be seen, the ends of the studs are turned through an angle equal to or approaching 90°. The studs are welded to the column so that their ends protrude upwardly and to the beam so that the ends protrude downwardly. The studs may be square section as illustrated or of round, rectangular or other cross-section. The angle which each stud end subtends to its shank may vary from that shown.

Figure 25:
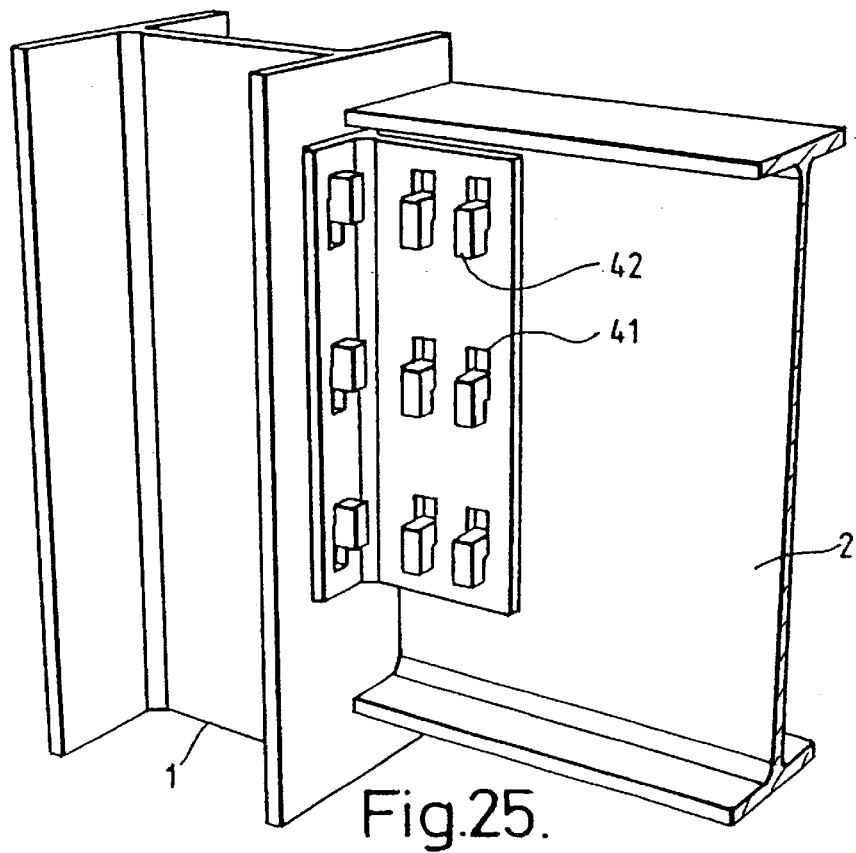
FIG. 25 is a perspective view of an assembly of the connector, column and beam illustrated in FIGS. 23, 24A and 24B.

As will be seen from FIG. 25, in use the stud ends pass through the slot heads and on assembly, engage connector margins either above or below the slots.

Figure 26:
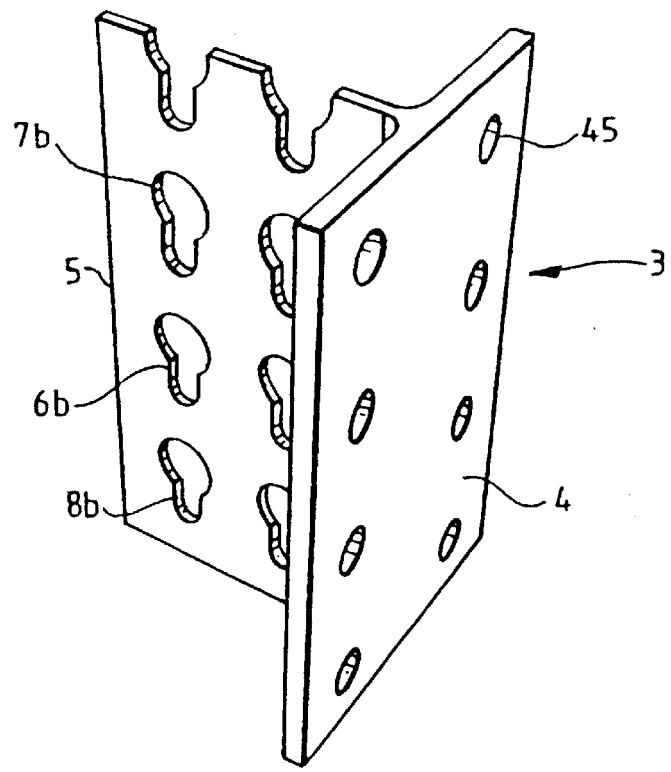
FIGS. 26 and 27 are perspective views illustrating an alternative connector in accordance with the invention.
Figure 27:
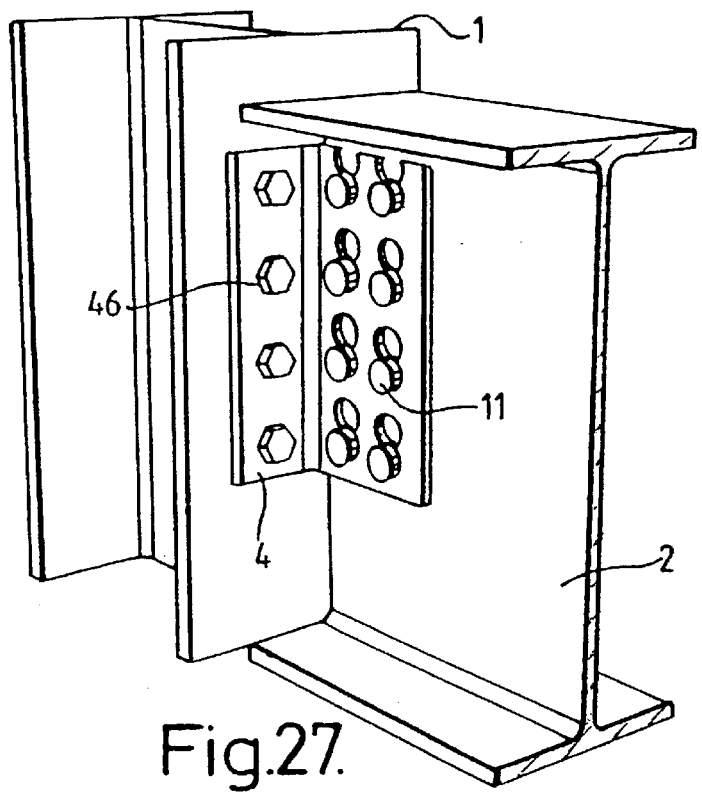

An alternative connector is illustrated in FIGS. 26 and 27. As for the previously described embodiments, the illustrated connector 3 comprises a flange 4 and an integral web 5. The connector shown in FIG. 26 is "T" shaped. It can, however, alternatively be "L" shaped or be of any of the other connector shapes discussed previously. As illustrated, the connector is hot formed. Alternatively, it may be produced by cold forming or by plates welded together. As for the earlier embodiments, the web 5 is formed with two arrays or series of generally vertically spaced slots 6b. As shown, each slot is of keyhole shape having an arcuate head 7b and a coextensive neck 8b sited below the respective head 7b. More than two arrays of slots 6b may be provided in the web.

The connector 3 illustrated in FIGS. 26 and 27 differs from those discussed previously in that the flange 4 is formed with two arrays or series of throughholes 45, one such array being positioned on each side of the joint between the web and the flange.

As will be seen more clearly from FIG. 27, the flange 4 of the connector is secured to the supporting column 1 by bolts 46 which pass through the throughholes 45 and through complementary positioned through-holes formed in the supporting columns. Other ways of connecting the flange to the column may be adopted, for example by welding the rear face of the flange to the supporting column.

Figure 28:
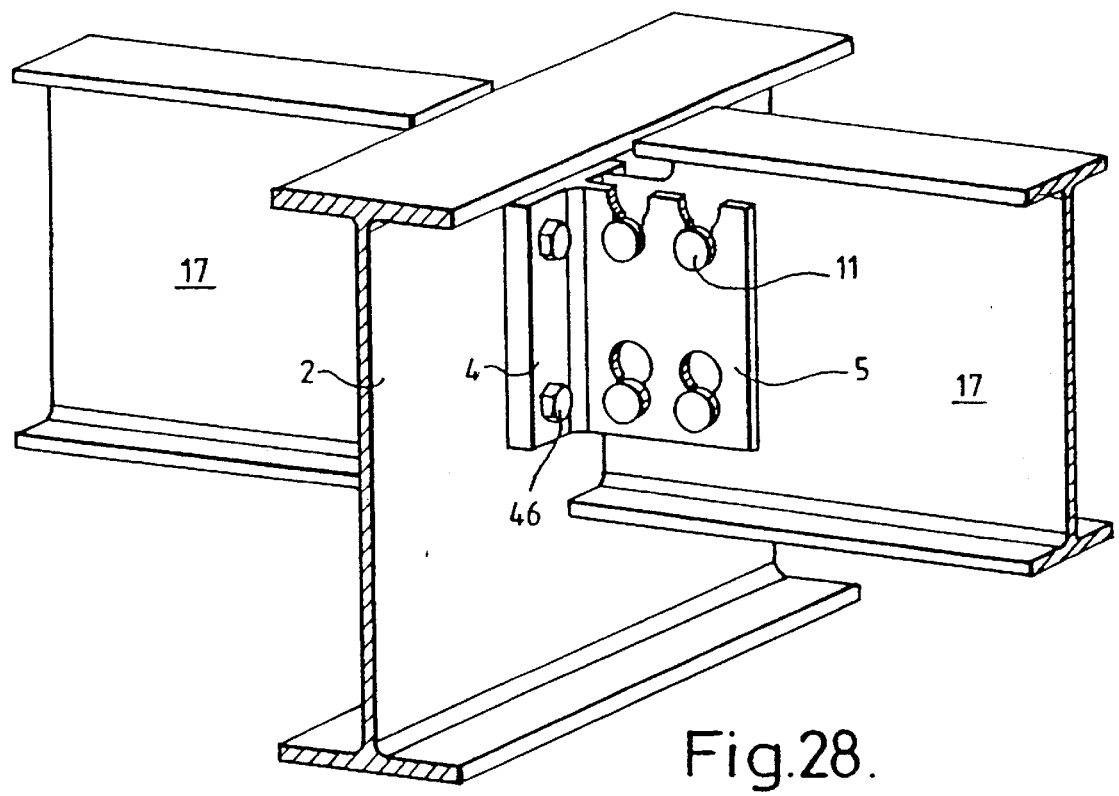
FIG. 28 is a perspective view of an alternative connector in accordance with the invention providing a beam to beam connection.

In the embodiment illustrated in FIG. 28, a "T" shaped connector 3 is bolted to each side of a web of a primary supporting beam 2, and provides connections between the primary beam and two opposed secondary beams 17. Because the supported secondary beams 17 are connected to both sides of the web of the primary supporting beam 2, a potential problem of delamination of the web of the primary beam exists if shear studs are welded back to back. The use of bolts 46 to connect the "T" connector to the primary beam overcomes this problem.

Figure 29:
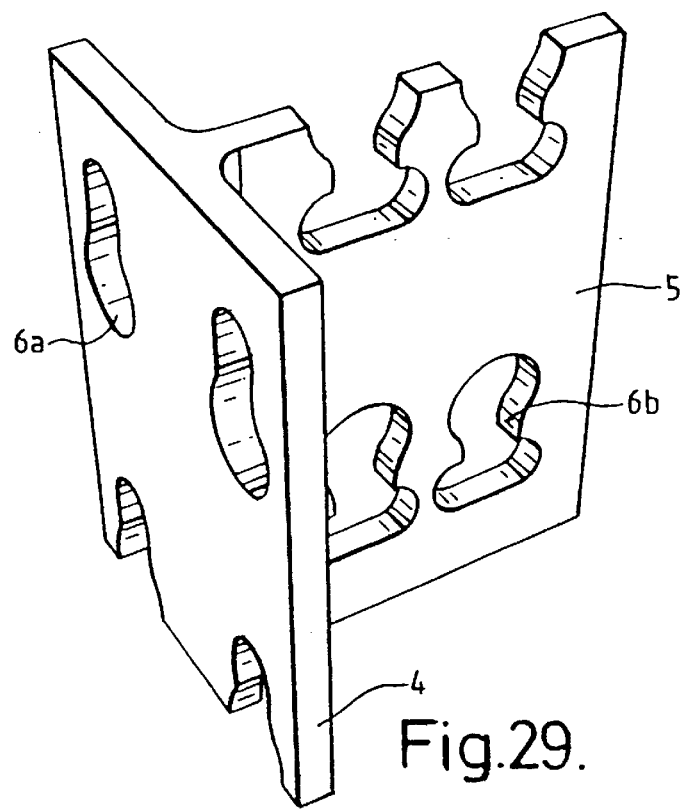
FIG. 29 is a perspective view of a further alternative connector in accordance with the invention.

The slots formed in the web of the connector illustrated in FIG. 29 have widened end portions which allow the connected beam to move sideways. This construction may be particularly beneficial where lack of fit between the connected members is encountered.

Figure 30:
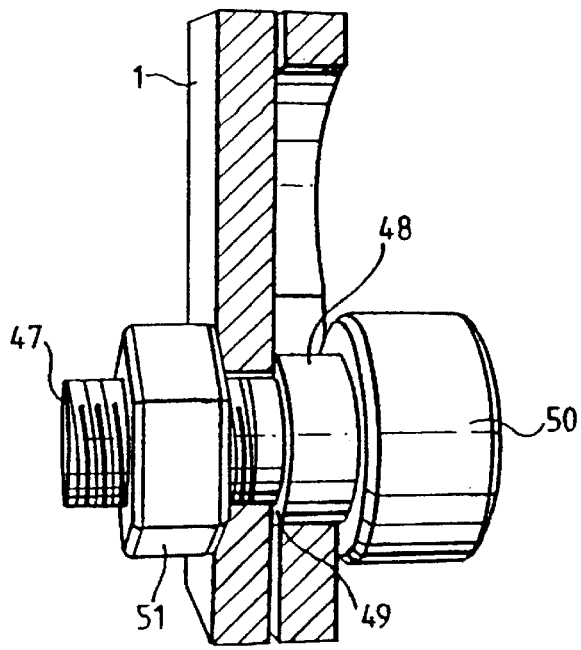
FIGS. 30 to 32 are perspective views of alternative shear studs in accordance with the invention.

Turning now to FIG. 30 of the drawings, the shear stud illustrated differs from those discussed previously in that it includes a threaded shank 47 which passes through a suitably dimensioned through hole forced in the supporting member 1. The shank 47 includes a collar 48 whose end-face 49 abuts against the opposed face of the member 1. The collar 48 spaces the stud head 50 from the member 1. A bolt 51 is threaded onto the shank end to secure the stud to the member 1.

Figure 31:
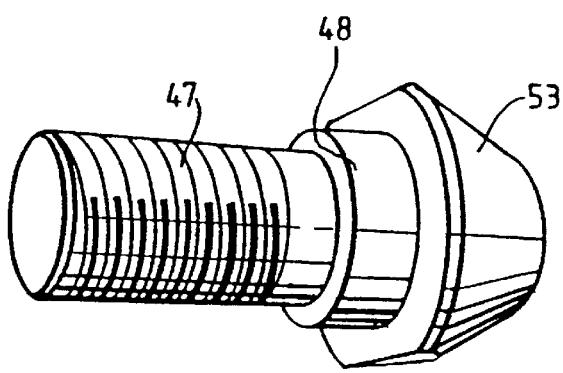

An alternative shear stud is illustrated in FIG. 31. This shear stud is similar to that shown in FIG. 30 to the extent that it includes a threaded shank 47 and a collar 48. In the FIG. 31 embodiment, however, the head 53 is tapered to assist initial mating of the head and the respective slot. Additionally, flat generally parallel slots are made in the top and bottom of the head 53 to aid gripping of the threaded stud as it is tightened.

Figure 32:
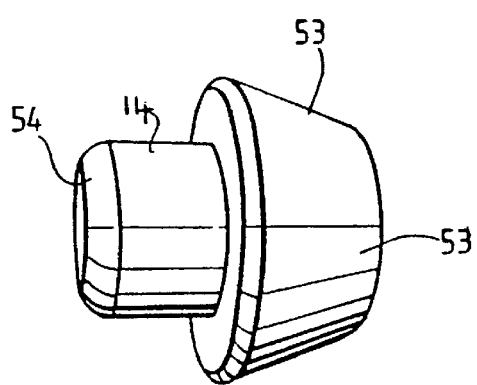

A further alternative shear stud is illustrated in FIG. 32. As for the stud shown in FIG. 30, the head 53 is tapered to provide greater tolerance for the initial mating of the head and the respective slot. In addition, the free end 54 of the shank 11 is rounded. The round profile results in a smaller weld fillet which is advantageous. In an unillustrated alternative embodiment, the shank 47 has an end portion of reduced diameter which, during the welding process, is filled with the metal which would otherwise produce a weld fillet. A suitably dimensioned collar of appropriate material may be employed to control movement of material during the welding process to infill the reduced diameter end portion of the stud. In this way, a fillet can be substantially or wholly removed.

The invention is well suited for use with composite decking, whereby a shear connection is provided between the top flange of the steel beam and the concrete. Thus, compression forces are developed in the concrete slab and tensile forces are developed in the steel beam.

Benefits of the invention include:

fast assembly;

safer assembly;

cheaper fabrication

The length selected for the necked portion of the slots will affect the probability of the supported member or the connector being dislodged. The optimum length of the necked portion of the connector is one which has a low probability of failing as a result of the supported beam or the connector being dislodged, for example impact with another member during erection of the structural assembly. The distance L between the centres of curvature $C_1$ and $C_2$ of the slot head and neck (see FIG. 5) also affects pull-through strength. If the distance L is small in comparison with the neck and head diameter, the tensile capacity of the connector is adversely affected. Moreover, the optimum length of each slot is one which allows a good number of slots to fit onto a given size of flange, whilst providing adequate security against being dislodged by impact and/or having adequate resistance against pull-through failure.

The thickness of the flange and web of the connector will affect buckling capacity of the connector and its capacity to resist tear-through by the shear-studs and the bearing stresses imposed on the plate by the shear studs. This thickness will need to be sufficiently large to give the plate adequate robustness and thus prevent local buckling and overall buckling and twisting of the connector. Selecting a suitable thickness may be achieved by use of standard design formulae available in codes such as BS5950: Part 1.1. Alternatively, finite element analysis and/or experimental testing may be used to develop suitable plate sizes. The same criteria influence the sizing of both the flange and the web of the connector.

It is reasonable to assume that connectors provided with more slots will form more connections with the supporting and supported members thus improving and securing the connection therebetween. Therefore connectors provided with up to 10 or more slots, as well as multiples thereof, are provided by this invention.

The distance between the tip of one slot and the base of an adjacent slot, either vertically above or below, may affect the ability of the connector to prevent the shear studs tearing through the connector material. The optimum distance between adjacent slots will be one which adequately safeguards against tear-through failure whilst at the same time allowing a maximum number of slots to be provided for a given length of connector. Plate thickness of connector also influences strength against tear-through type failures.

It will be appreciated that the shear studs shown in the drawings are merely exemplary of one of many types of fittings that can be attached to the supporting and supported members. As discussed previously, it will be appreciated also that the slots can vary in shape, size and configuration depending on the nature of the fittings intended to be used in conjunction with the connector.

It will be appreciated that modifications may be made to the connecting apparatus described above and illustrated in the drawings without departing from the true scope of the invention as set out in the accompanying claims.

What is claimed is:

1. An assembly of a connector and first and second structural members each having a flange portion and a web portion, the flange and web portions of each structural member including at least one stud extending therefrom, the connector providing a connection between the structural members and comprising a flange arranged for connection to the flange portion of the first structural member and a web arranged for connection to the web portion of the second structural member, the flange and web of the connector formed with an array of two or more spaced slots each having an enlarged upper portion and a coextensive narrower lower portion, the enlarged portions of each slot being dimensioned to receive a head of the at least one stud which projects from the surfaces of the structural members and the narrower portion of each slot being dimensioned to receive the shank of one such stud and to trap the head of that stud behind the margins of the slot narrower portions thereby to connect the structural members together.

2. An assembly as claimed in claim 1 wherein the flange of the connector is formed with an array of two or more spaced slots each having an enlarged lower portion and a coextensive narrower upper portion.

3. An assembly as claimed in claim 1 wherein each stud projects from the surface of the first structural member in a direction normal to the longitudinal axis of the first structural member.

4. An assembly as claimed in claim 1 wherein the flange projects substantially perpendicularly from the web.

5. An assembly as claimed in claim 1 wherein each stud includes a shank secured to the structural members and a head and wherein a series of generally vertically spaced slots are formed in the flange of the connector, each such slot including a head and a restricted neck positioned above and coextensive with the head, the slots being dimensioned and sited to enable the heads of the studs which project from the surface of the structural members to pass through the heads of the slots of the connector flange with the stud shanks being received within the necks of the slots.

6. An assembly as claimed in claim 1 wherein the slots are keyhole shaped.

7. An assembly as claimed in claim 1 wherein the margins of the head and necked portions of the slots are curvilinear.

8. An assembly as claimed in claim 1 wherein the diameter of the enlarged portion of each slot is between 0.5 and 3 mm larger than the diameter or width of the respective stud head.

9. An a assembly as claimed in claim 1 wherein the narrower portion of each slot is shaped to engage with the sides of the shank of the respective stud.

10. An assembly as claimed in claim 1 wherein the width of the narrower portion of the slot is between 0.5 and 3 mm larger than the stud shank diameter.

11. An assembly as claimed in claim 1 in which the connector is "T" shaped in cross-section.

12. An assembly as claimed in claim 1 wherein the connector is "L" shaped in cross-section.

13. An assembly as claimed in claim 1 wherein the web of the connector is welded to the web of the second structural member.

14. An assembly as claimed in claim 1 wherein the connector is produced from hot rolled steel.

15. An assembly as claimed in claim 1 wherein the shank includes a collar whose end abuts the margin around the hole formed in the member and acts to space the stud head from the member.

16. An assembly as claimed in claim 1 wherein the studs are shear studs formed of steel.

17. An assembly as claimed in claim 1 wherein the studs are of equal length.

18. An assembly as claimed in claim 1 wherein the first and second structural members are profiled sections of hot-rolled steel.

19. An assembly as claimed in claim 1 wherein the structural members are hot rolled steel columns and beams.

20. An assembly as claimed in claim 1 wherein the connector comprises an angle plate comprising a flange and an integral web set generally normal to one another.

21. An assembly as claimed in claim 1 wherein the connector is formed from lengths of hot or cold-rolled steel.

22. An assembly as claimed in claim 1 wherein the connector is formed from steel plate with stamped-out slots and then folded by cold forming to produce an "L" section.

23. An assembly as claimed in claim 1 wherein the slots of the connector are formed by flame cutting or a stamping process.

24. An assembly as claimed in claim 1 wherein the web of the connector lies in a plane which is parallel to the longitudinal axis of the first structural member.

25. An assembly as claimed in claim 1 wherein the web and flange of the connector are produced from welded hot rolled steel plate.

26. A load bearing assembly comprising:
    first and second structural members each having a flange portion and a web portion, the second structural member including at least one stud extending from the web portion thereof; and
    a connector comprising a flange arranged for connection to the flange portion of the first structural member and a web arranged for connection to the web portion of the second structural member, the web of the connector subtending an angle to the flange and defining at least one slot bordered on all sides by web material arranged to receive the at least one stud of the web portion of the second structural member.

27. The assembly as claimed in claim 26 wherein the flange of the connector comprises a solid rectangular plate.

28. The assembly as claimed in 27 wherein the flange is welded onto the flange portion of the one structural member.

29. The assembly as claimed in claim 26 wherein the connector has a T-shaped cross-section, said T-shaped cross-section defined by the flange and the web of the connector.

30. The assembly as claimed in claim 26 wherein the web of the connector extends perpendicularly from the flange and generally bisects the flange.

31. An assembly as claimed in claim 26 wherein the flange is bolted, welded or otherwise secured to the first structural member.

32. A load bearing assembly comprising:
    a first structural member comprising a column having at least one planar surface;
    a second structural member having a flange portion and a web portion, at least one stud extending from the web portion of the second structural member; and
    a connector comprising a flange arranged for connection to at least one planar surface of the first structural member and a web arranged for connection to the web portion of the second structural member, the web of the connector subtending an angle to the flange and defining at least one slot bordered on all sides by web material arranged to receive the at least one stud of the web portion of the second structural member.

33. The assembly as claimed in claim 32, wherein the flange of the connector comprises a rectangular plate.

34. The assembly as claimed in 33 wherein the flange is welded onto the flange portion of the one structural member.

35. The assembly as claimed in claim 32 wherein the connector has a T-shaped cross-section, said T-shaped cross-section defined by the flange and the web of the connector.

36. The assembly as claimed in claim 32 wherein the web of the connector extends perpendicularly from the flange and generally bisects the flange.

37. A load bearing assembly comprising:
   first and second structural members each having a flange portion and a web portion, the second structural member including at least one stud extending from the web portion thereof; and
   a connector comprising a flange arranged for connection to web portions of the first structural member and a web arranged for connection to the web portion of the second structural member, the web of the connector subtending an angle to the flange and defining at least one slot bordered on all sides by web material arranged to receive the at least one stud of the web portion of the second structural member.

38. The assembly as claimed in claim 37, wherein the flange of the connector comprises a rectangular plate.

39. The assembly as claimed in 38 wherein the flange is welded onto the flange portion of the one structural member.

40. The assembly as claimed in claim 37 wherein the connector has a T-shaped cross-section, said T-shaped cross-section defined by the flange and the web of the connector.

41. The assembly as claimed in claim 37 wherein the web of the connector extends perpendicularly from the flange and generally bisects the flange.

42. An assembly of a connector and first and second structural members each having a flange portion and a web portion, the flange and/or web portion of each structural member including at least one stud extending therefrom, the connector providing a connection between the structural members and including a flange arranged for connection to the flange or web portion of the first structural member and a web arranged for connection to the web portion of the second structural member, the flange and/or web of the connector being formed with an array of two or more spaced slots each having an enlarged upper portion and a coextensive narrower lower portion, the enlarged portions of each the slots being configured and dimensioned to receive a head of the at least one stud and the narrower portion of each slot being dimensioned to receive the shank of one such stud and to trap the head of the stud behind the margins of the slot narrower portions thereby to connect the structural members together.

* * * * *